United States Patent
Do et al.

(10) Patent No.: US 8,971,956 B2
(45) Date of Patent: Mar. 3, 2015

(54) METHOD OF PROVIDING NEIGHBOR INFORMATION AND METHOD OF GENERATING NEIGHBOR LOCATION INFORMATION

(75) Inventors: Mi-Sun Do, Suwon-si (KR); Taori Rakesh, Suwon-si (KR); Sung Jin Lee, Seoul (KR); Hun Je Yeon, Seoul (KR); Hyun Jeong Kang, Seoul (KR); Jai Yong Lee, Seoul (KR)

(73) Assignees: Samsung Electronics Co., Ltd., Suwon-si (KR); Industry-Academic Cooperation Foundation, Yonsei University, Seoul (KR)

( * ) Notice: Subject to any disclaimer, the term of this patent is extended or adjusted under 35 U.S.C. 154(b) by 1806 days.

(21) Appl. No.: 11/822,472

(22) Filed: Jul. 6, 2007

(65) Prior Publication Data

US 2008/0096581 A1    Apr. 24, 2008

(30) Foreign Application Priority Data

Oct. 18, 2006  (KR) .................. 10-2006-0101446
Jun. 1, 2007   (KR) .................. 10-2007-0054054

(51) Int. Cl.
*H04B 7/185*  (2006.01)
*H04M 11/00*  (2006.01)
(Continued)

(52) U.S. Cl.
CPC ............. *H04B 7/2606* (2013.01); *H04W 48/10* (2013.01); *H04W 64/00* (2013.01); *H04W 88/04* (2013.01); *H04W 88/08* (2013.01)
USPC ........ 455/555; 455/411; 455/417; 455/432.1; 455/456.2; 455/552.1

(58) Field of Classification Search
CPC .............. H04B 7/18513; H04B 7/195; H04B 7/18521; H04W 12/06; H04W 12/12; H04W 4/16; H04W 3/54; H04W 84/16; H04W 4/02; H04W 64/00; H04L 63/06; H04L 29/08657; H04L 29/08108; H04L 29/08936; H04M 2207/18; H04M 3/42314
USPC .......... 455/13.1, 411, 456.3, 417, 455.1, 434, 455/552.1, 432.1, 555; 370/254, 255, 331, 370/315, 353, 369; 375/260; 342/457
See application file for complete search history.

(56) References Cited

U.S. PATENT DOCUMENTS 4,829,554 A * 5/1989 Barnes et al. ............... 455/432.1
5,265,150 A * 11/1993 Helmkamp et al. .......... 455/555
(Continued)

FOREIGN PATENT DOCUMENTS

EP    1786231 A1    5/2007
JP    09-093639 A   4/1997
(Continued)

OTHER PUBLICATIONS

Abraham George, M3HN: An Adaptive Protocol for Mobility Management in Multi-Hop Heterogeneous Networks, Proceedings of the 10th IEEE Symposium on Computers and Communications (ISCC 2005), Louisville, KY, U.S.A.
(Continued)

*Primary Examiner* — William D Cumming
(74) *Attorney, Agent, or Firm* — NSIP Law

(57) ABSTRACT

Provided are a method of providing neighbor information and a method of generating neighbor location information. The method of providing neighbor information includes a base station broadcasting a neighbor advertisement message; and the base station transmitting a neighbor information message to a relay station connected to the base station.

36 Claims, 14 Drawing Sheets

(51) Int. Cl.
*H04M 1/66* (2006.01)
*H04M 1/68* (2006.01)
*H04M 3/16* (2006.01)
*H04M 1/00* (2006.01)
*H04W 24/00* (2009.01)
*H04M 3/42* (2006.01)
*H04B 7/26* (2006.01)
*H04W 48/10* (2009.01)
*H04W 64/00* (2009.01)
*H04W 88/04* (2009.01)
*H04W 88/08* (2009.01)

(56) References Cited

U.S. PATENT DOCUMENTS

| | | | | |
|---|---|---|---|---|
| 5,675,629 | A * | 10/1997 | Raffel et al. | 455/552.1 |
| 5,911,120 | A * | 6/1999 | Jarett et al. | 455/417 |
| 6,236,365 | B1 * | 5/2001 | LeBlanc et al. | 342/457 |
| 6,463,055 | B1 * | 10/2002 | Lupien et al. | 370/353 |
| 6,611,692 | B2 * | 8/2003 | Raffel et al. | 455/552.1 |
| 6,681,118 | B2 * | 1/2004 | Raffel et al. | 455/552.1 |
| 6,735,432 | B1 * | 5/2004 | Jarett et al. | 455/417 |
| 7,206,294 | B2 * | 4/2007 | Garahi et al. | 370/315 |
| 7,366,111 | B2 * | 4/2008 | Thubert et al. | 370/254 |
| 7,428,221 | B2 * | 9/2008 | Thubert et al. | 370/255 |
| 7,689,215 | B2 * | 3/2010 | Kwon et al. | 455/434 |
| 2003/0043857 | A1 | 3/2003 | Takagi et al. | |
| 2005/0265259 | A1 * | 12/2005 | Thubert et al. | 370/255 |
| 2005/0282562 | A1 | 12/2005 | Lee et al. | |
| 2006/0039371 | A1 * | 2/2006 | Castro et al. | 370/389 |
| 2006/0068823 | A1 | 3/2006 | Kwon et al. | |
| 2006/0227724 | A1 * | 10/2006 | Thubert et al. | 370/254 |
| 2007/0060049 | A1 * | 3/2007 | Lee et al. | 455/13.1 |
| 2007/0123292 | A1 | 5/2007 | Kang et al. | |
| 2008/0096581 | A1 * | 4/2008 | Do et al. | 455/456.2 |
| 2008/0108326 | A1 * | 5/2008 | Park et al. | 455/411 |
| 2008/0291875 | A1 * | 11/2008 | Kang et al. | 370/331 |
| 2009/0219832 | A1 * | 9/2009 | Velev et al. | 370/254 |
| 2010/0316019 | A1 * | 12/2010 | Liu et al. | 370/331 |
| 2011/0051826 | A1 * | 3/2011 | Jung et al. | 375/260 |

FOREIGN PATENT DOCUMENTS

| | | |
|---|---|---|
| JP | 2001-209891 A | 8/2001 |
| JP | 2001-309421 A | 11/2001 |
| JP | 2002-142242 A | 5/2002 |
| JP | 2006279950 | 10/2006 |
| KR | 1020000039907 | 7/2000 |
| KR | 10-2004-0019622 A | 3/2004 |
| KR | 10-2005-0102570 A | 10/2005 |
| KR | 10-2005-0103012 A | 10/2005 |
| KR | 1020050097107 | 10/2005 |
| KR | 1020060049401 | 5/2006 |
| KR | 10-2006-0076640 A | 7/2006 |
| KR | 1020060121137 | 11/2006 |
| KR | 1020070030635 | 3/2007 |
| WO | WO2006046824 | 5/2006 |
| WO | WO2006107701 | 10/2006 |

OTHER PUBLICATIONS

European Search Report issued Oct. 28, 2013 in corresponding EP Patent Application No. 07833026.3 (15 pages).
M. Asa et al. "Comments on the Proposed Technical Requirements for IEEE 802.16 Relay TG" IEEE C802.16j-06/105 (Sep. 19, 2006) 12 pages.
R. Taori et al. "Reduced Neighbor Information Generation and Customized Delivery" IEEE S80216j-07/139 (Jan. 16, 2007) 8 pages.
Chie Ming Chou et al. "Network Topology Advertisement for IEEE 802.16j" IEEE C802.16j-06/166 (Nov. 7, 2006) 10 pages.

* cited by examiner

FIG. 2

| NEIGHBOR \ ORIGIN | BS0 | RS(1) | RS(2) | ... | RS(n) |
|---|---|---|---|---|---|
| BS0 |  | $(d_{10}, \omega_{10})$ | $(d_{20}, \omega_{20})$ | ... | $(d_{n0}, \omega_{n0})$ |
| RS(1) | $(d_{01}, \omega_{01})$ |  | $(d_{21}, \omega_{21})$ | ... | $(d_{n1}, \omega_{n1})$ |
| RS(2) | $(d_{02}, \omega_{02})$ | $(d_{12}, \omega_{12})$ |  | ... | $(d_{n2}, \omega_{n2})$ |
| ⋮ | ⋮ | ⋮ | ⋮ |  | ⋮ |
| RS(n) | $(d_{0n}, \omega_{0n})$ | $(d_{1n}, \omega_{1n})$ | $(d_{2n}, \omega_{2n})$ | ... |  |

FIG. 6

| SYNTAX | SIZE | NOTES |
|---|---|---|
| MMR_LOC-REQ_Message_Format(){ | - | - |
| Type = xx | 8 bits | |
| Report Type | 2 bits | 00:Non-periodic<br>01:Periodic<br>10:Event-triggered report<br>11:reserved |
| Report Metric | 8 bits | Bitmap indicationg metrics on which the corresponding triggers are based |
| Coordinate Type | 2 bits | Coordinate type (x, y, z) of location information<br>00:GPS<br>01:Cartesian<br>10~11:reserved |
| N_Node_index | 4 bits | Number of nodes of which a BS/RS wants to know the location information |
| For(j=0;j<N_Node_index;j++) { | - | - |
| Node_index | 8 bits | |
| } | - | - |
| } | - | - |

| SYNTAX | SIZE | NOTES |
|---|---|---|
| MMR_LOC-RSP_Message_Format(){ | - | - |
| Type = xx | 8 bits | |
| Report Type | 2 bits | 00:Non-periodic<br>01:Periodic<br>10:Event-triggered report<br>11:reserved |
| Report Metric | 8 bits | Bitmap indicationg presence of certain metrics on which the corresponding triggers are based. |
| If(Report Metric[bit#] == 0])<br>  Metric value | variable | If there are some presences in the "Report Metric" field, this field shall represent the corresponding metric values |
| Coordinate Type | 2 bits | Coordinate type (x, y, z) of location information<br>00:GPS<br>01:Cartesian<br>10~11:reserved |
| N_Node_index | 4 bits | Number of nodes that their location information is included in MMR_LOC-RSP message |
| For(j=0;j<N_Node_index;j++) { | variable | |
| Node_index | 8 bits | The Node_index requested in MMR_LOC-REQ message. |
| Location information | 24 bits | location coordinates of the Node index according to Coordinate type |
| } | | |
| } | | |

FIG. 7

| SYNTAX | SIZE | NOTES |
|---|---|---|
| MMR_NBR-INFO_Message_format(){ | | Using unicast CID |
|   Management Message type = XX | 8 bits | – |
|   Skip-optional-fields bitmap | 8 bits | – |
|   If(Skip-optional-fields-[0]=0) { | – | – |
|     Operator ID } | 24 bits | Operator's Unique ID |
|   Configuration Change Count | 8 bits | Incremented each time |
|   Fragmentation Index | 4 bits | Current fragmentation index |
|   Total Fragmentation | 4 bits | # of total fragmentations |
|   N_NEIGHBORS | 8 bits | – |
|   for (j=0; j<N_NEIGHBORS ; j++){ | – | – |
|     Length, PHY Profile ID, FA Index, BS EIRP, Neighbor BSID | 56 bits | BS means BS or RS. |
|     Preamble Index/Subchannel Index, HO Optimization, Scheduling Supported, DCD/UCD CFG Cnt, | 16 bits | – |
|     Neighbor station type | 4 bits | 0b0000: BS<br>0b0001: MMR-BS<br>0b0010~0b0011: reserved<br>0b0100: fixed RS,<br>0b0101:nomadic RS<br>0b0110:mobile RS<br>0b0111: reserved<br>0b1000: MS<br>0b1001~0b1111: reserved |
|     Coordinate type | 2 bits | Coordinate type (x,y,z) of location information |
|     Location information | 24 bits | location coordinates of the neighbor according to Coordinate type |
|     TLV Encoded Neighbor info. | Variable | – |
|   } | – | – |
| } | | |

METHOD OF PROVIDING NEIGHBOR INFORMATION AND METHOD OF GENERATING NEIGHBOR LOCATION INFORMATION

CROSS-REFERENCE TO RELATED APPLICATIONS

This application claims the benefit under 35 U.S.C. §119(a) of Korean Patent Application No. 10-2006-0101446, filed on Oct. 18, 2006, and Korean Patent Application No. 10-2007-0054054, filed on Jun. 1, 2007 in the Korean Intellectual Property Office, the entire disclosures of which are hereby incorporated by reference.

BACKGROUND OF THE INVENTION

1. Field of the Invention

The present invention relates to a wireless communication system. More particularly, the present invention relates to a multi-hop wireless communication system which performs multi-hop communication via a relay station.

2. Description of Related Art

Multi-hop communication is used to improve communication coverage and system capacity. Specifically, a relay station is a basic component for multi-hop communication in a cellular system. However, there is more neighbor information in multi-hop communication systems having relay stations than in communication networks having only base stations since multi-hop communication systems having relay stations include more neighbors than communication networks having only base stations. Specifically, the number of neighbors associated with a particular node increases since the relay stations in the communication network are included in the number of neighbors. Also, neighbor information increases since the number of neighbors increases. Accordingly, the number of neighbors in a neighbor list increases.

The increase in the number of neighbors causes a huge increase in overhead when distributing the neighbor information. Also, the increase in the number of neighbors increases the time spent in performing a scan process for the hand-off in a mobile station.

Accordingly, it is important to decrease the number of neighbors included in a neighbor list of a multi-hop communication system where the relay stations are added. However, when the number of neighbors included in the neighbor list is not efficiently reduced, necessary neighbors may be deleted from the neighbor list.

Accordingly, there is a need for a new method of providing neighbor information. In the new method of providing neighbor information, from a mobile station's point of view, electric power and effort required to scan for neighbors, as well as handover delay, is reduced. Also, from a system's point of view, the overhead, which is necessary for distributing neighbor information, is reduced and necessary neighbors are prevented from being deleted.

SUMMARY OF THE INVENTION

Exemplary embodiments of the present invention address at least the above problems and/or disadvantages and provide at least the advantages described below. Accordingly, an aspect of exemplary embodiments of the present invention is to provide a method of providing neighbor information efficiently. Another aspect of the present invention is to generate neighbor location information which is utilized to reduce neighbor information of unnecessary neighbors by using location information.

An aspect of the present invention also provides a method of providing neighbor information and a method of generating neighbor location information which reduces the electric power and time required to scan for neighbors in a mobile station, as well as handover delay.

An aspect of the present invention also provides a method of providing neighbor information and a method of generating neighbor location information which reduces the overhead which is necessary when transmitting neighbor information in a multi-hop communication system.

An aspect of the present invention also provides a method of providing neighbor information and a method of generating neighbor location information which selects and provides only neighbor information suitable for a particular node.

According to an aspect of the present invention, a method of providing neighbor information is provided, the method including a base station broadcasting a neighbor advertisement message; and the base station transmitting a neighbor information message to a relay station connected to the base station, the generated neighbor information message being customized for the receiving relay station. Preferably, customization is done by considering a location of the relay station.

In this embodiment, the method of providing neighbor information further includes the relay station generating a new neighbor advertisement message including only a portion of a neighbor list by using the neighbor information message, the neighbor list being included in the neighbor advertisement message; and broadcasting the new neighbor advertisement message to downstream of the relay station including the mobile stations in the cell.

In this embodiment, the method of providing neighbor information further includes the base station transmitting a location request message to neighbor nodes; the base station receiving a location response message which is transmitted from the neighbor nodes in response to the location request message; forming a neighbor location information table by using the location response message; and the base station generating the neighbor advertisement message by using the neighbor location information table.

According to an aspect of the present invention, a method of generating neighbor location information is provided, the method including any one of a base station and a relay station transmitting a location request message to neighbor nodes; any one of the base station and the relay station receiving a location response message which is transmitted from the neighbor nodes in response to the location request message; and forming a neighbor location information table by using the location response message.

In this embodiment, in the transmitting of the location request message, the location request message from the base station to the relay station, the location request message from the relay station to another relay station, and the location request message from the relay station to the base station may be transmitted.

In this embodiment, the location request message includes a report type field which indicates whether to receive the location response message regularly or irregularly, or indicates whether to receive the location response message when a particular event is triggered.

In this embodiment, the location response message comprises location information of a node included in the location request message.

In this embodiment, the neighbor location information table stores a distance and an angle between one of the base station or the relay station, and the neighbor nodes.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following detailed description, taken in conjunction with the accompanying drawings in which:

FIG. 2 is a diagram illustrating a neighbor location information table according to an exemplary embodiment of the present invention;

FIG. 6 is a diagram illustrating a message format of a location request message and a location response message according to an exemplary embodiment of the present invention;

FIG. 7 is a diagram illustrating a message format of neighbor information message according to an exemplary embodiment of the present invention;

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
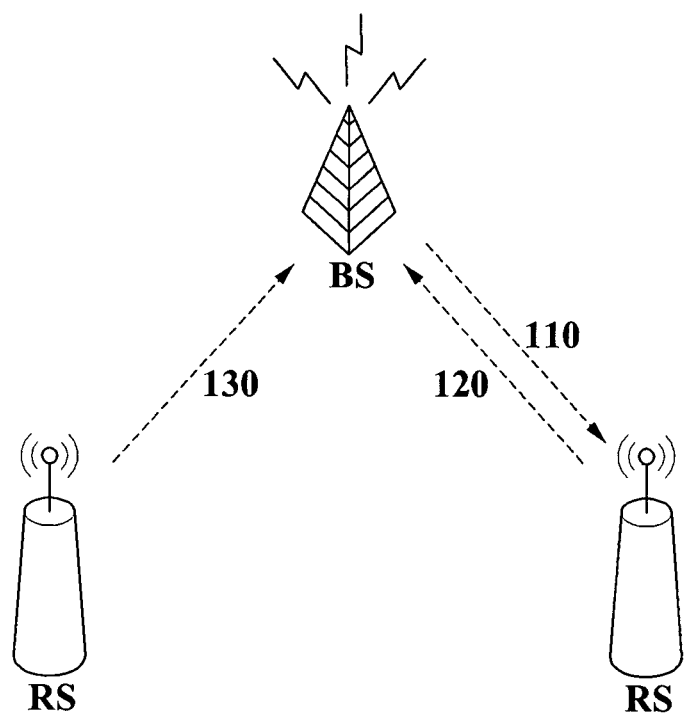
FIG. 1 is a diagram illustrating an example of a system where a method of generating neighbor location information is performed according to an exemplary embodiment of the present invention.

FIG. 1 is a diagram illustrating a system where a method of generating neighbor location information is performed according to an exemplary embodiment of the present invention.

Referring to FIG. 1, in the system where the method of generating neighbor location information is performed according to an exemplary embodiment of the present invention, a base station BS transmits a location request message to a neighbor node (110), and the neighbor node which receives the location request message transmits a location response message in response to the location request message (120).

In this embodiment, the location request message may include a report type field which indicates whether to receive the location response message regularly or irregularly, or indicates whether to receive the location response message when a particular event is triggered.

In this embodiment, the location response message may include location information of a node included in the location request message. The location information may be global positioning system (GPS) coordinates, three-dimensional Cartesian coordinates, and the like.

Also, the base station may regularly receive the location response message from the neighbor node (130).

Although it is not illustrated in FIG. 1, the base station may receive the location response message from a neighbor node where the particular event is triggered, according to an exemplary embodiment of the present invention.

In this embodiment, the neighbor node may be a relay station RS around the base station, or another base station.

The base station which receives the location response message from neighbor nodes may store a location of each of the neighbor nodes in a neighbor location information table. The location of each of the neighbor nodes includes a distance and an angle between the base station and the neighbor nodes.

For example, when $(x_0, y_0, z_0)$ designates a location of the base station, and $(x_1, y_1, z_1)$ designates a location of the relay station, the base station calculates location information of the relay station, as shown in Equation 1.

$$\begin{cases} d_{01} = \sqrt{(x_1 - x_0)^2 + (y_1 - y_0)^2 + (z_1 - z_0)^2} \\ \omega_{01} = \tan^{-1}\frac{y_1 - y_0}{x_1 - x_0} \end{cases} \quad \text{[Equation 1]}$$

In this embodiment, the relay station may also store the location of each of the neighbor nodes in the neighbor location information table according to a capability of the relay station. The location of each of the neighbor nodes includes the distance and the angle between the base station and the neighbor nodes.

In the neighbor location information table, the distance and the angle between the base station and the neighbor nodes may be stored.

Not only the base station, but also mobile station and the relay station may receive the location response message.

FIG. 2 is a diagram illustrating an a neighbor location information table according to an exemplary embodiment of the present invention.

In FIG. 2, $d_{NM}$ designates a distance from a node corresponding to an N to a node corresponding to an M. $\omega_{NM}$ designates an angle of the node corresponding to the M from the node corresponding to the N. In this case, each of the N and M is a integer not less than zero. Also, the node corresponds to a base station or a relay station.

FIG. 2 illustrates an exemplary embodiment of the present invention only when the node is included in a single multi-hop relay cell. The multi-hop relay cell corresponds to a zone including a single base station and relay stations which are controlled by the single base station.

Figure 3:
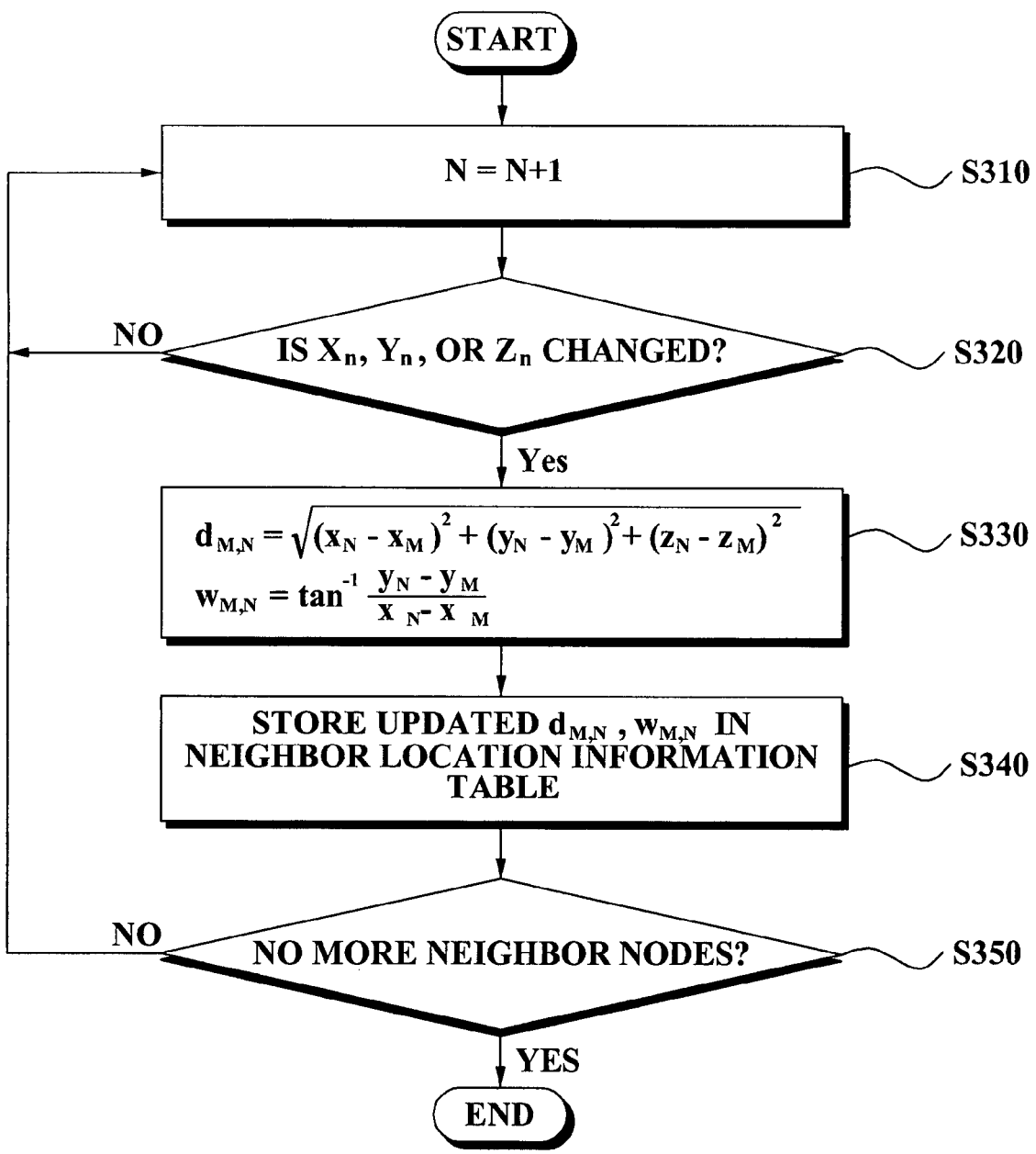
FIG. 3 is a flowchart illustrating a method of generating neighbor location information performed in a base station or a relay station according to an exemplary embodiment of the present invention.

FIG. 3 is a flowchart illustrating a method of generating neighbor location information performed in a base station or a relay station according to an exemplary embodiment of the present invention.

Referring to FIG. 3, in operation S310, the base station or the relay station increments an index by one. In operation S320, it is determined whether a coordinate of a node corresponding to the increased index changes.

In operation S330, as a result of the determination in operation S320, when the coordinate of the node corresponding to the increased index is changed, a distance and an angle between the node and a reference point is calculated.

As a result of the determination in operation S320, when the coordinate of the node corresponding to the increased index is not changed, the base station or the relay station returns to operation S310 and increments an index by one.

In operation S340, the base station or the relay station updates the calculated distance and angle in a neighbor location information table.

In operation S350, it is determined whether generating of neighbor location information with respect to all neighbor nodes is completed.

As a result of the determination in operation S350, when the generating of neighbor location information with respect to all neighbor nodes is completed, all operations end.

As a result of the determination in operation S350, when the generating of neighbor location information with respect to all neighbor nodes is not completed, the base station or the relay station returns to operation S310 and increments an index by one.

In the method of providing neighbor information according to an exemplary embodiment of the present invention, the base station or the relay station generates a neighbor advertisement message by using a neighbor location information table.

The neighbor advertisement message corresponds to a message which is broadcasted from the base station or the relay station to another relay station.

Also, in the method of providing neighbor information according to an exemplary embodiment of the present invention, the base station or the relay station generates the neighbor information message. In this embodiment, the relay station provides a relay service downstream.

In this embodiment, the neighbor information message corresponds to a unicast message, and is generated by considering location information of a node which receives the neighbor information message.

Accordingly, a node which receives both the neighbor advertisement message and the neighbor information message does not retransmit the received neighbor advertisement message downstream. Also, the node generates and broadcasts a new neighbor advertisement message including only a portion of a neighbor list based on the received neighbor information message. The neighbor list is included in the received neighbor advertisement message.

Figure 4:
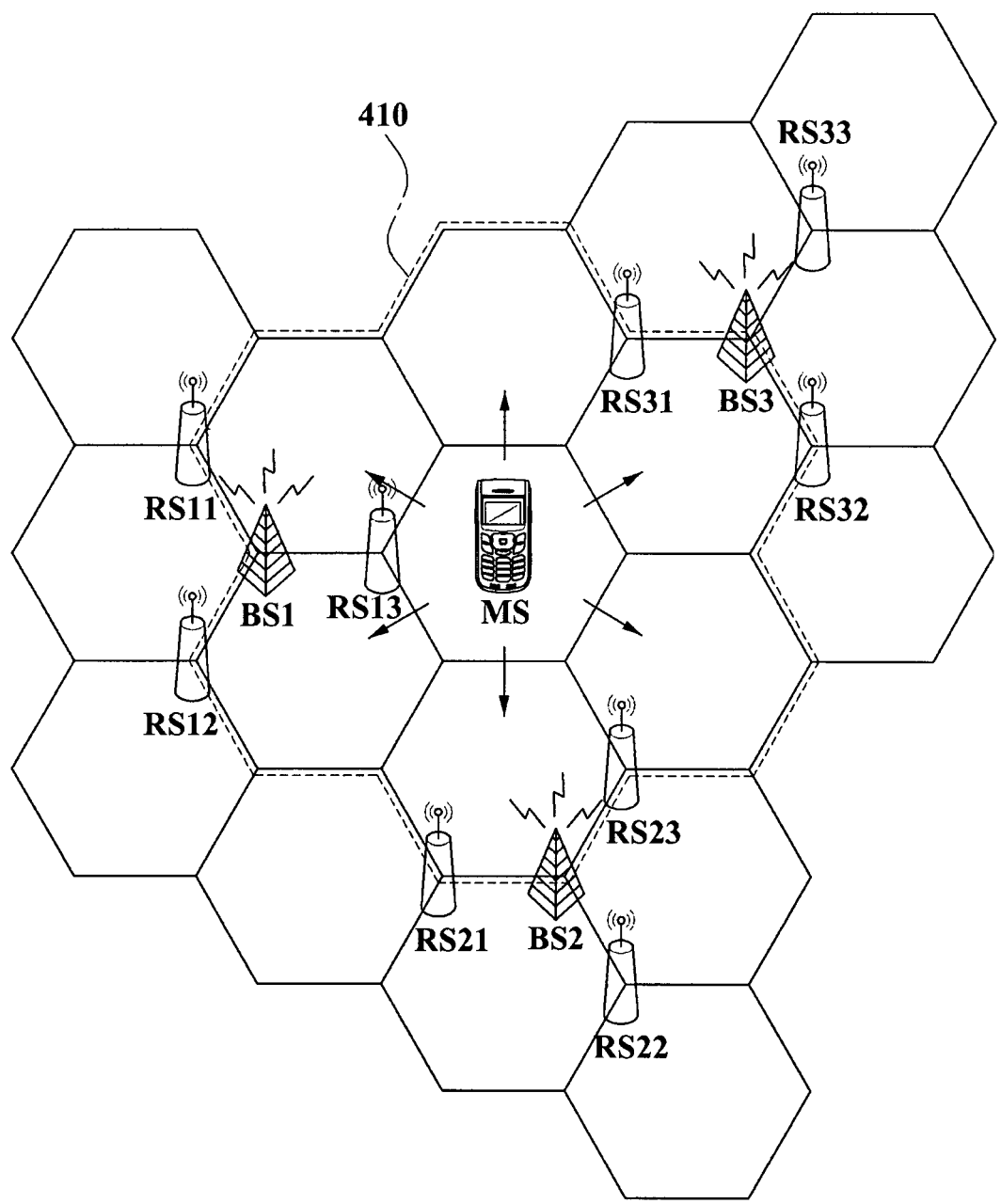
FIG. 4 is a diagram illustrating a system where a method of providing neighbor information is performed according to an exemplary embodiment of the present invention.

FIG. 4 is a diagram illustrating a system where a method of providing neighbor information is performed according to an exemplary embodiment of the present invention.

Referring to FIG. 4, a serving station of a mobile station MS corresponds to a relay station RS13.

In this embodiment, a range where the mobile station may move corresponds to a zone 410 within a dotted line. Accordingly, with respect to the mobile station, neighbor information corresponding to nodes included in the zone 410 within the dotted line is required to be provided.

According to an exemplary embodiment of the present invention, the base station BS1 includes location information of neighboring base stations BS2 and BS3, and location information of relay stations RS21, RS22, RS23, RS31, RS32, and RS33. The relay stations RS21, RS22, RS23, RS31, RS32, and RS33 are serviced by the neighboring base stations BS2 and BS3. Accordingly, the base station BS1 transmits location information to the relay station RS13, that is the serving station of the mobile station. In the location information, location information of neighbor nodes, which are located relatively far from the serving station, such as RS33 or RS22, is deleted. Thus, the mobile station may be prevented from performing an unnecessary calculation.

In this embodiment, when the relay stations are not uniformly distributed, it may not be easy to determine a neighbor list by simply considering a distance. Thus, according to an exemplary embodiment of the present invention, the neighbor list may be determined by setting a predetermined number of zones according to a θ value based on a reference point, and selecting neighbors corresponding to a local policy for each zone. In this embodiment, the neighbors are located within a predetermined distance. For example, a neighbor which is the most adjacent to each zone or neighbors which are located within a predetermined distance d may be selected. The reference point may correspond to the base station or the relay station. In FIG. 4, the reference point may be the serving station, i.e. the relay station RS13.

Figure 5:
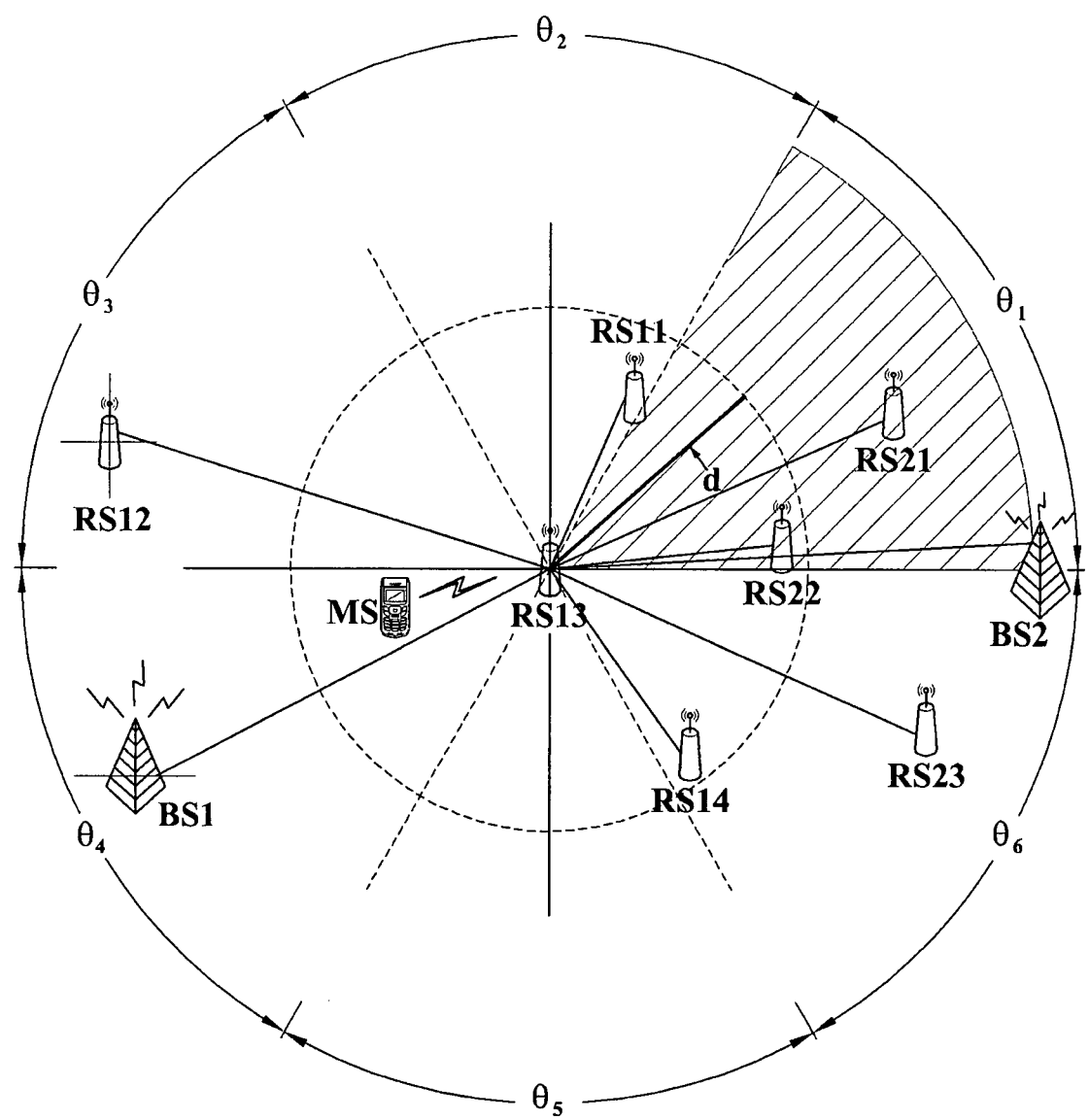
FIG. 5 is a diagram illustrating a method of determining a neighbor list when a neighbor node is non-uniformly distributed according to an exemplary embodiment of the present invention.

FIG. 5 is a diagram illustrating a method of determining a neighbor list when a neighbor node is non-uniformly distributed according to an exemplary embodiment of the present invention.

Referring to FIG. 5, a serving station of a mobile station corresponds to a relay station RS13.

In the exemplary embodiment of the present invention illustrated in FIG. 5, the serving station is a reference point, that is the relay station RS13. When divided into six zones by an identical θ value, based on the reference point, the six zones having 60° for each zone are established. In FIG. 5, each of the six zones corresponds to a zone $\theta_1$, a zone $\theta_2$, a zone $\theta_3$, a zone $\theta_4$, a zone $\theta_5$, and a zone $\theta_6$, respectively. The example illustrated in FIG. 5 illustrates selecting neighbors which are located within a distance d in each zone.

In the zone $\theta_1$, a neighbor node, which is located within the distance d based on the reference point, is a relay station RS22.

In the zone $\theta_2$, a neighbor node, which is located within the distance d based on the reference point, is a relay station RS11.

In the zone $\theta_3$, the zone $\theta_4$, and the zone $\theta_5$, a neighbor node, which is located within the distance d based on the reference point, is non-existent. Specifically, in zone $\theta_3$, relay station RS12 is located outside the distance d based on the reference point, and in zone $\theta_4$, base station BS1 is located outside the distance d based on the reference point.

In the zone $\theta_6$, a neighbor node, which is located within the distance d based on the reference point, is a relay station RS14.

Accordingly, in the example illustrated in FIG. 5, only the relay stations RS11, RS22, and RS14 may be included in the neighbor list.

Depending on the system, a zone including many nodes may be segmented, and the distance d may be differently set for each zone.

FIG. 6 is a diagram illustrating a message format of a location request message and a location response message.

Referring to FIG. 6, each of the location request message MMR_LOC-REQ and the location response message MMR_LOC-RSP includes a report type filed, a coordinate type field, a report metric field, a node index N_Node_index, and other appropriate fields. The location request message MMR_LOC-REQ includes a node index of each node in which ascertaining of location information is required. Also, the location response message MMR_LOC-RSP includes location information of requested nodes.

In this embodiment, the location request message MMR_LOC-REQ includes the report type field. The report type field indicates whether to receive the location response message MMR_LOC-RSP regularly or irregularly, or indicates whether to receive the location response message MMR_LOC-RSP when a particular event is triggered.

In this embodiment, the report metric field may indicate a metric which triggers the particular event in response to the particular event when receiving the location response message MMR_LOC-RSP.

In this embodiment, the location request message MMR_LOC-REQ may request location information of other nodes as well as a node which receives the location request message MMR_LOC-REQ.

In this embodiment, the node index may be an index indicating nodes in which ascertaining of the location information is required.

In this embodiment, the coordinate type field may indicate a coordinate type of the location information.

The location response message MMR_LOC-RSP may include location information of a node included in the location request message MMR_LOC-REQ.

FIG. 7 is a diagram illustrating a message format of neighbor information message. The neighbor information message is transmitted to a relay station, which is located downstream of a base station or the relay station by a base station or a relay station downstream of the base station or relay station, in a unicast method. Also, the neighbor information message transmits neighbor information which is customized for the relay station.

Referring to FIG. 7, the neighbor information message has a format similar to a neighbor advertisement message, and includes a neighbor station type field and location information field for each neighbor on a neighbor list. In this case, the neighbor station type is for identifying the base station, the relay station, a mobile station, and the like.

Figure 8:
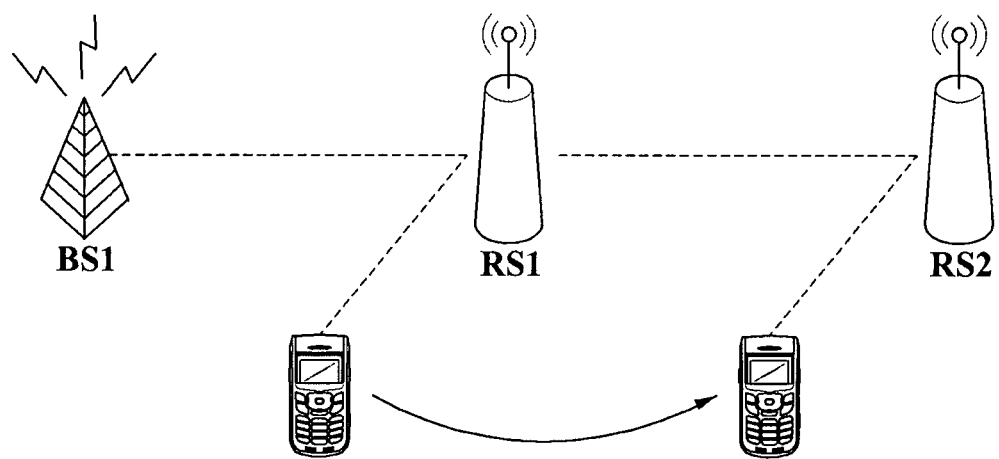
FIG. 8 is a diagram illustrating a system corresponding to a method of providing neighbor information and a method of generating neighbor location information according to an exemplary embodiment of the present invention.

FIG. 8 is a diagram illustrating a system corresponding to an exemplary embodiment of a method of providing neighbor information and a method of generating neighbor location information.

Referring to FIG. 8, while a relay station RS1 is a serving station, a mobile station moves, and thus the serving station is changed to a relay station RS2.

In this embodiment, the relay station RS2 is connected to a base station BS1 via the relay station RS1.

Figure 9:
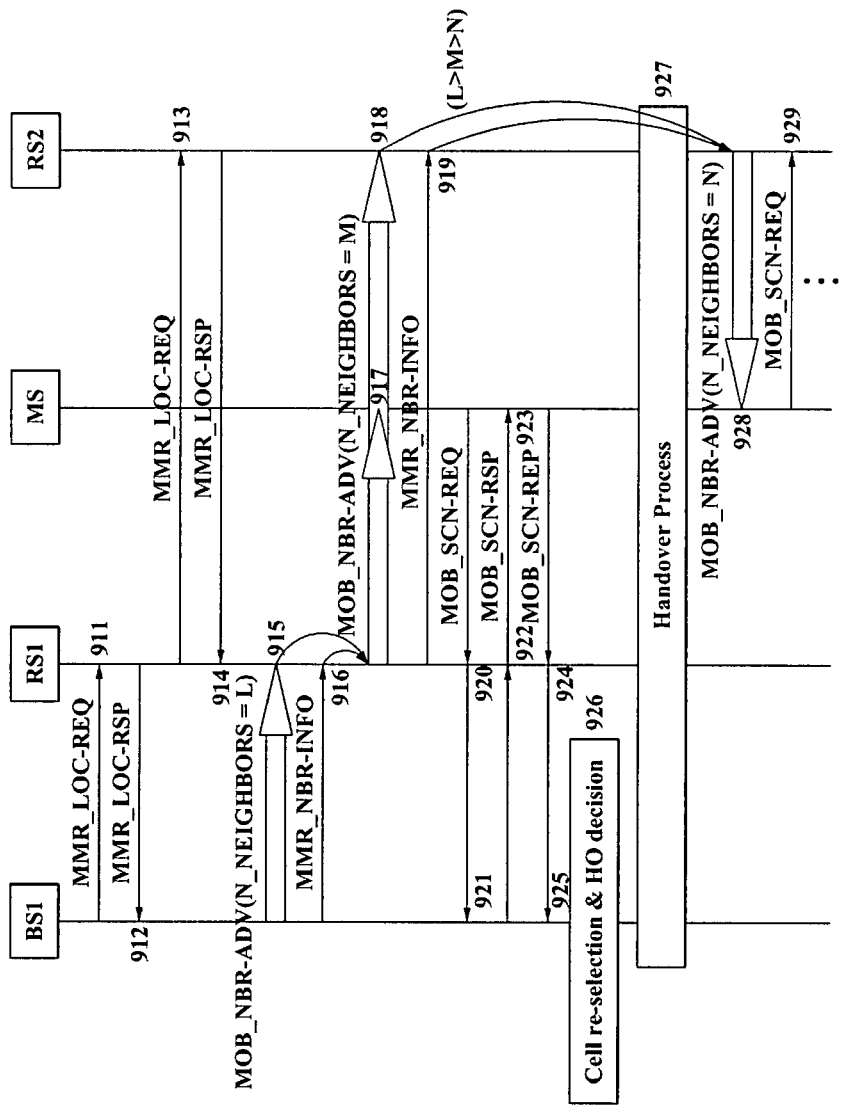
FIG. 9 is a flowchart illustrating a method of providing neighbor information and a method of generating neighbor location information applied to the system illustrated in FIG. 8 according to an exemplary embodiment of the present invention.

FIG. 9 is a flowchart illustrating a method of providing neighbor information and a method of generating neighbor location information are applied to the system illustrated in FIG. 8 according to an exemplary embodiment of the present invention.

Referring to FIG. 9, in operation 911, a base station BS1 transmits a location request message to a relay station RS1. In operation 912, the base station BS1 receives a location response message from the relay station RS1. Also, in operation 913, the relay station RS1 transmits the location request message to a relay station RS2, and in operation 914, the relay station RS1 receives the location response message from the relay station RS2. In this embodiment, the base station BS1 may transmit the location request message to the relay station RS2.

In operation 915, the base station BS1 generates a neighbor location information table by using the received location response message, and broadcasts a neighbor advertisement message by using the neighbor location information table. In this case, L designates a number of neighbors included in the broadcasted neighbor advertisement message. L is a natural number.

In operation 916, the base station BS1 generates a neighbor information message by considering a location of the relay station RS1, and transmits the neighbor information message to the relay station RS1 in a unicast method.

In operations 917 and 918, the relay station RS1 generates and broadcasts a new neighbor advertisement message by using the neighbor advertisement message and neighbor information message which are received from the base station BS1. In this embodiment, M designates a number of neighbors included in the new neighbor advertisement message. M is a natural number, and may be less than L.

Also, in operation 919, the relay station RS1 generates the neighbor information message by considering a location of the relay station RS2, and transmits the neighbor information message to the relay station RS2.

In operations 920, 921, 922, 923, 924 and 925, a mobile station MS, which receives the broadcasted neighbor advertisement message, performs a scan process. In operation 926, the base station BS1 determines whether a handover process is required. When required, the handover process is performed in operation 927. In FIG. 9, a handover from the relay station RS1 to the relay station RS2 is illustrated.

In operation 928, the relay station RS2 generates and broadcasts a new neighbor advertisement message by using the neighbor advertisement message and neighbor information message which are received from the relay station RS1. In this embodiment, N designates a number of neighbors included in the new neighbor advertisement message. N is a natural number, and may be less than M.

In operation 929, the mobile station MS performs a new scan process based on the new broadcasted neighbor advertisement message from relay station RS2.

As described above, the neighbor information message includes a neighbor list which is customized for a node receiving the neighbor information message. Also, the relay station generates the neighbor advertisement message by using the received neighbor information message. The base station BS1 and the relay stations RS1 and RS2 broadcast the neighbor advertisement message to nodes within a coverage area of respective base station BS1 and the relay stations RS1 and RS2.

Figure 10:
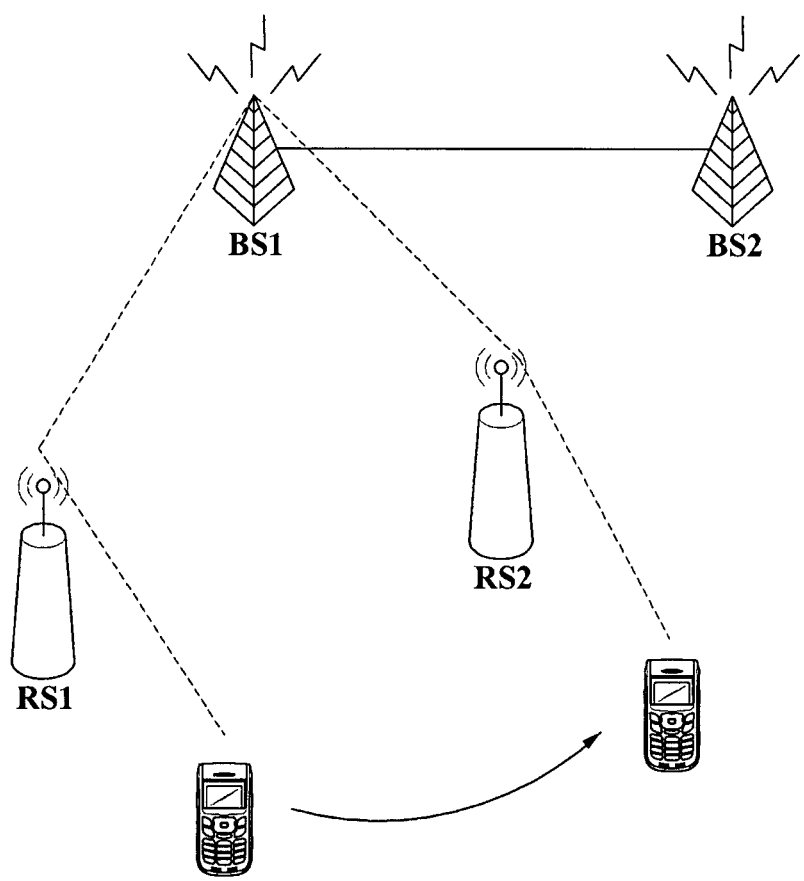
FIG. 10 is a diagram illustrating a system corresponding to a method of providing neighbor information according to an exemplary embodiment of the present invention.

FIG. 10 is a diagram illustrating a system corresponding to an exemplary embodiment of a method of providing neighbor information according to an exemplary embodiment of the present invention.

Referring to FIG. 10, while a relay station RS1 is a serving station, a mobile station moves, and thus the serving station is changed to a relay station RS2.

In this embodiment, the relay station RS1 and the relay station RS2 are connected to a base station BS1, and the base station BS1 is connected to a base station BS2.

Figure 11:
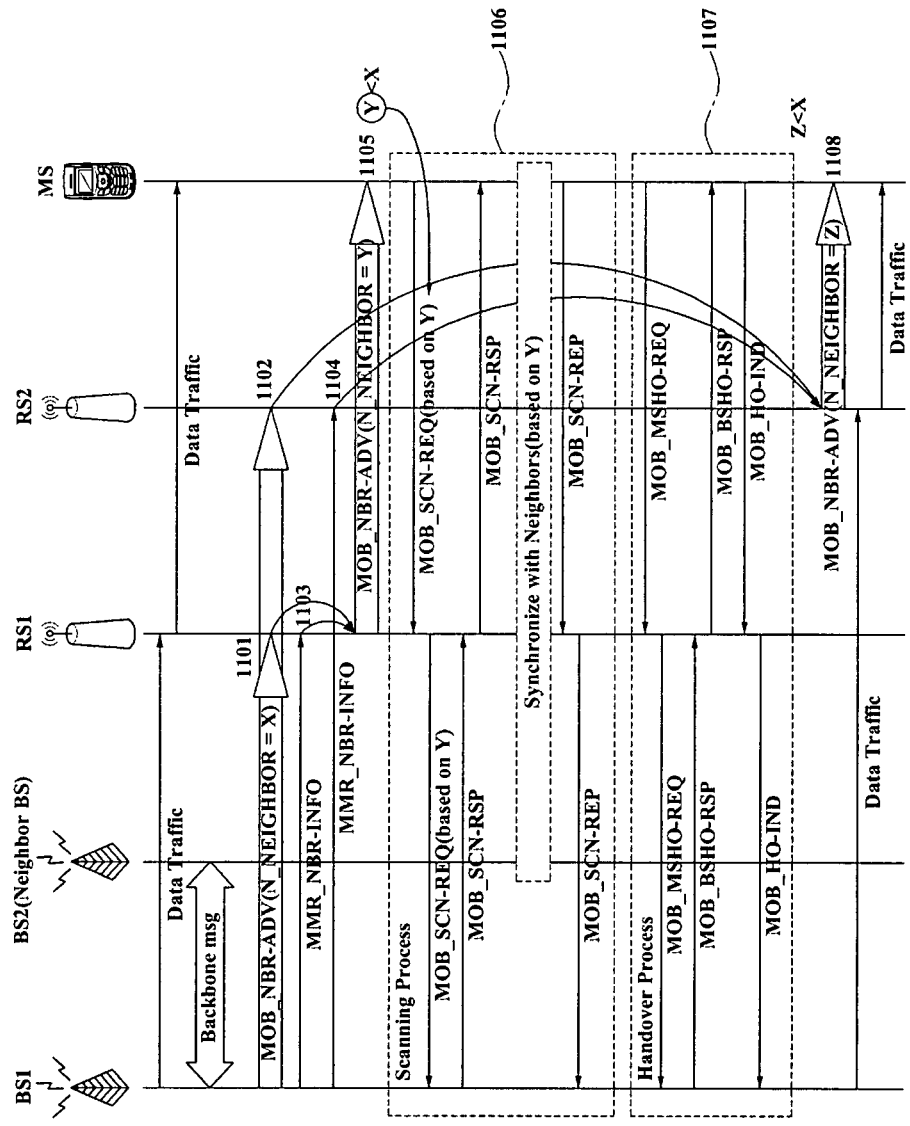
FIG. 11 is a flowchart illustrating a method of providing neighbor information applied to the system illustrated in FIG. 10 according to an exemplary embodiment of the present invention.

FIG. 11 is a flowchart illustrating an example where a method of providing neighbor information is applied to the system illustrated in FIG. 10. A base station transmits data to a mobile station MS via a relay station RS1, and an operation for acquiring location information has already been performed. Also, base stations transmit and receive control information via a backbone message.

Referring to FIG. 11, in operations 1101 and 1102, a base station BS1 broadcasts a neighbor advertisement message. In this embodiment, X designates a number of neighbors included in the neighbor advertisement message to be broadcasted. X is a natural number.

In operation 1103, the base station BS1 generates a neighbor information message which is customized for the relay station RS1 by considering a location of the relay station RS1, and transmits the neighbor information message to the relay station RS1.

In operation 1104, the base station BS1 generates a neighbor information message which is customized for the relay station RS2 by considering a location of the relay station RS2, and transmits the neighbor information message to the relay station RS2.

In operation 1105, the relay station RS1 generates and broadcasts a new neighbor advertisement message by using the neighbor advertisement message and the neighbor information message which are received from the base station BS1. In this embodiment, Y designates a number of neighbors included in the new neighbor advertisement message. Y is a natural number and may be less than X.

In operation 1106, the mobile station which receives the broadcasted neighbor advertisement message performs a scan process. As a result of the scan process, when a handover process is required, the handover process is performed in operation 1107.

As a result of the handover process, when a serving station of the mobile station changes to the relay station RS2, the mobile station acquires neighbor information by receiving the neighbor advertisement message which is broadcasted from the relay station RS2. In this embodiment, the neighbor advertisement message is a new neighbor advertisement message which is generated by using the neighbor advertisement message and the neighbor information message in operation 1108. The neighbor advertisement message and the neighbor information message are received from the base station BS1. Z designates a number of neighbors included in the new neighbor advertisement message. Z is a natural number, and may be less than X.

The base station BS1 provides the customized neighbor information message to the relay station RS1 and the relay station RS2, respectively. Accordingly, the neighbor advertisement message and the messages are associated with the scan process and handover process may have a neighbor list reduced by location information.

Figure 12:
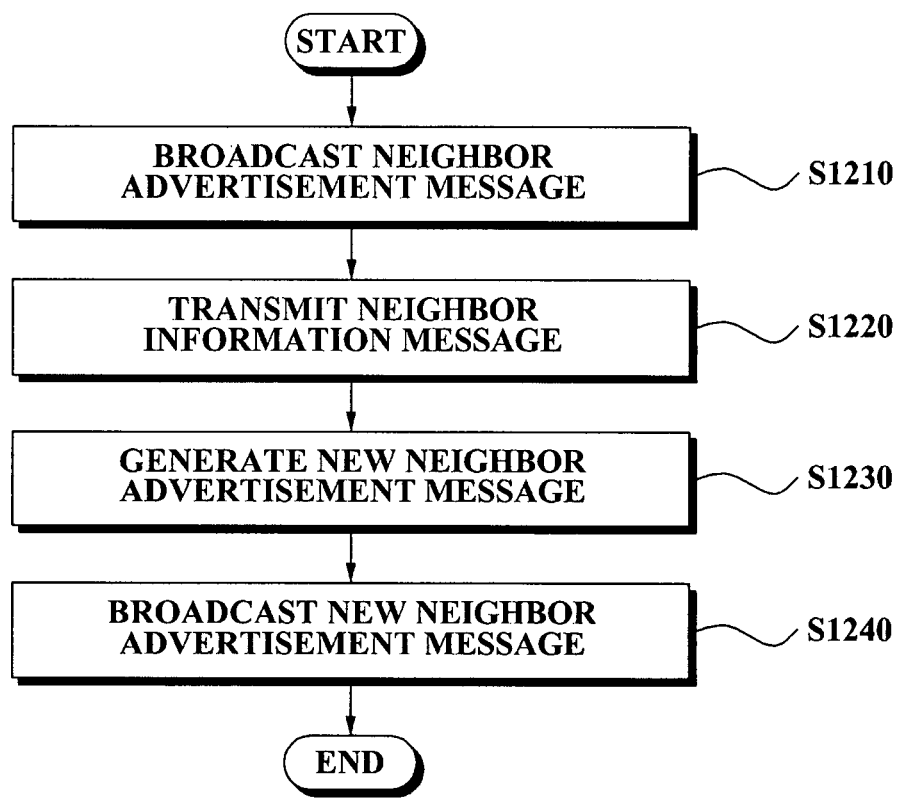
FIG. 12 is a flowchart illustrating a method of providing neighbor information according to an exemplary embodiment of the present invention.

FIG. 12 is a flowchart illustrating a method of providing neighbor information according to an exemplary embodiment of the present invention.

Referring to FIG. 12, in the method of providing neighbor information according to an exemplary embodiment of the present invention, in operation S1210, a base station broadcasts a neighbor advertisement message.

In this embodiment, the neighbor advertisement message may include a neighbor list. The neighbor list is generated by referring to a location of neighbors and a reference point. Also, the neighbor list may be generated by setting a predetermined number of zones based on the reference point, and selecting neighbors corresponding to a local policy for each zone or selecting neighbors located within a predetermined distance. The predetermined number of zones may be non-uniformly set according to a distribution of the neighbors. Also, the local policy may correspond to selecting the neighbors within a distance, and the distance may be non-uniformly set according to a distribution of the neighbors.

In operation S1220, the base station transmits a neighbor information message to a relay station which is connected to the base station. The neighbor information message is generated by considering a location of the relay station.

In this embodiment, the neighbor information message may include a neighbor list. The neighbor list is generated by referring to a location of the neighbors and the relay station. The neighbor list may be generated by setting a predetermined number of zones based on the relay station, and selecting the neighbors located within the predetermined distance corresponding to the local policy for each zone. The predetermined number of zones may be non-uniformly set according to the distribution of the neighbors. Also, the local policy corresponds to selecting the neighbors within a distance, and the distance may be non-uniformly set according to the according to the distribution of the neighbors by local policy.

In this embodiment, the neighbor information message corresponds to a unicast message.

The neighbor information message may include a neighbor station type field.

In operation S1230, the relay station generates a new neighbor advertisement message including only a portion of neighbor list by using the neighbor information message. In this embodiment, the neighbor list is included in the neighbor advertisement message.

In operation S1240, the new neighbor advertisement message is broadcasted downstream of the relay station.

In this embodiment, the relay station may transmit a neighbor information message, which is custom generated for the base station by considering a location of other relay stations, to the other relay station, when the other relay station exists downstream of the relay station.

Also, the method of providing neighbor information may further include determining a neighbor to be scanned by using neighbors in the neighbor list included in a message, and performing a scan process with respect to the neighbor to be scanned. In the determining of the neighbor to be scanned, a mobile station receives the message which is generated by using a message corresponding to the new neighbor advertisement message.

Also, the method of providing neighbor information may further include the following operations: the base station transmitting a location request message to neighbor nodes; the base station receiving a location response message which is transmitted from the neighbor nodes in response to the location request message; forming a neighbor location information table by using the location response message; and the base station generating the neighbor advertisement message by using the neighbor location information table.

The method of providing neighbor information may be performed by relay stations which serve other relay stations downstream of the relay station, excluding the base station.

Figure 13:
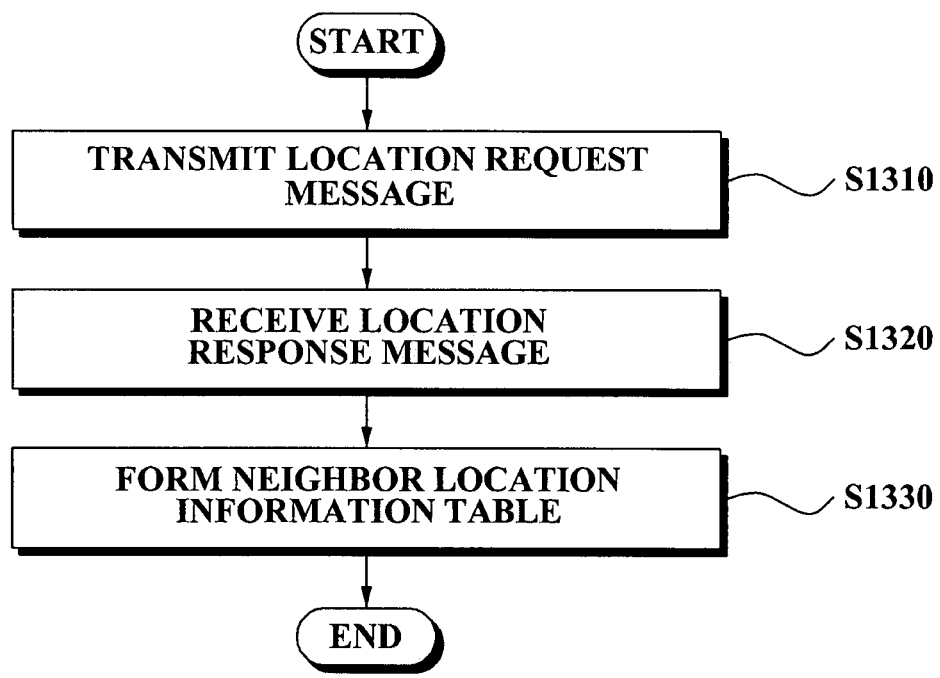
FIG. 13 is a flowchart illustrating a method of generating neighbor location information according to an exemplary embodiment of the present invention.

FIG. 13 is a flowchart illustrating a method of generating neighbor location information according to an exemplary embodiment of the present invention.

Referring to FIG. 13, in the method of generating neighbor location information according to an exemplary embodiment of the present invention, in operation S1310, any one of a base station and a relay station transmits a location request message to neighbor nodes.

In operation S1320, any one of the base station and the relay station receives a location response message which is transmitted from the neighbor nodes in response to the location request message.

In operation S1330, a neighbor location information table is formed by using the location response message.

In this embodiment, the location request message includes a report type field. The report type field indicates whether to receive the location response message periodically or non-periodically, or indicates whether to receive the location response message when a particular event is triggered.

In this embodiment, the location response message includes location information of the node which receives the location request message and location information of nodes included in the location request message.

The neighbor location information table may store a distance and an angle between one of the base station or the relay station, and the neighbor nodes.

Figure 14:
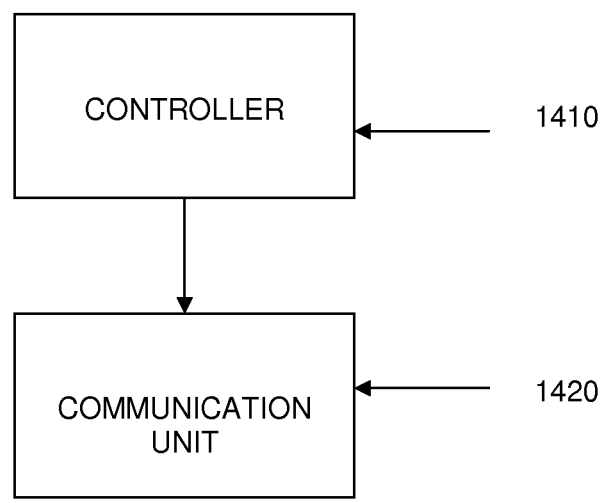
FIG. 14 is a diagram illustrating a network apparatus in a wireless communication network, according to an example.

FIG. 14 is a diagram illustrating a network apparatus in a wireless communication network, according to an example. The network apparatus in a wireless communication network includes a communication unit 1420 configured to broadcast a neighbor advertisement message over the wireless communication network and a controller 1410 configured to generate a neighbor information message with respect to each of at least one node in the wireless communication network, wherein the communication unit transmits the generated neighbor information message to each of the at least one node.

The method of providing neighbor information and the method of generating neighbor location information according to the above-described exemplary embodiments of the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

According to an aspect of the present invention, a method of providing neighbor information and a method of generating neighbor location information reduces neighbor information of unnecessary neighbors by using location information.

Also, according to an aspect of the present invention, a method of providing neighbor information and a method of generating neighbor location information reduces the electric power and time required to scan for a neighbor in a mobile station, as well as handover delay.

Also, according to an aspect of the present invention, a method of providing neighbor information and a method of generating neighbor location information reduces the overhead which is necessary when transmitting neighbor information in a multi-hop communication system.

Also, according to an aspect of the present invention, a method of providing neighbor information and a method of generating neighbor location information selects and provides only neighbor information suitable for a particular node.

While certain exemplary embodiments of the invention have been shown and described with reference to certain preferred embodiments thereof, it will be understood by those skilled in the art that various changes in form and details may be made therein without departing from the spirit and scope of the invention as defined by the appended claims and their equivalents.

What is claimed is:

1. A method of generating neighbor information, performed in a wireless communication network, the method comprising:
    transmitting, by a base station or a relay station, a location request message to at least one node belonging to the wireless communication network;
    receiving, by the base station or the relay station, a location response message from the at least one node; and
    generating a neighbor list using the location response message, and
    generating, by the base station or the relay station, a neighbor advertisement message using the neighbor list.

2. The method of claim 1, wherein the neighbor list is generated by setting a predetermined number of zones based on a predetermined reference point, and by selecting nodes according to a local policy for each zone.

3. The method of claim 2, wherein the predetermined number of zones is non-uniformly set according to a distribution of neighboring nodes.

4. The method of claim 2, wherein the reference point corresponds to the base station or the relay station.

5. The method of claim 1, wherein the location response message comprises location information of the at least one node that received the location request message transmitted by the base station.

6. The method of claim 1, wherein the neighbor list comprises a distance and an angle between the base station or the relay station and the at least one node.

7. The method of claim 1, wherein the location request message comprises a report type field indicating whether to receive the location response message regularly or intermittently, or indicating whether to receive the location response message when a particular event is triggered.

8. The method of claim 7, wherein, when the location response message is received in response to the particular event, the location request message comprises a report metric field indicating a metric that triggers the particular event.

9. The method of claim 1, wherein the location request message requests location information of other nodes excluding the at least one node receiving the location request message.

10. The method of claim 9, wherein the location request message comprises a node index field of each node in which determining of the location information is requested.

11. The method of claim 1, wherein the location response message comprises location information of the at least one node that received the location request message transmitted by the base station or relay station.

12. The method of claim 11, wherein the location response message comprises a coordinate type field indicating a coordinate type of the location information.

13. A method of providing neighbor information, performed in a wireless communication network, the method comprising:
receiving, by a node, a neighbor advertisement message that is broadcast from a base station or a relay station over the wireless communication network;
receiving, by the node, a neighbor information message that is transmitted from the base station or the relay station;
generating a second neighbor advertisement message comprising at least one portion of a neighbor list comprised in the neighbor advertisement message, using the neighbor advertisement message and the neighbor information message; and
broadcasting, by the node, the second neighbor advertisement message over the wireless communication network.

14. The method of claim 13, wherein the neighbor list is generated by referring to a predetermined reference point and to positions of neighboring nodes.

15. The method of claim 14, wherein the neighbor list is generated by setting a predetermined number of zones based on the reference point, and by selecting neighboring nodes according to a local policy for each zone.

16. The method of claim 15, wherein the predetermined number of zones is non-uniformly set according to a distribution of the neighboring nodes.

17. The method of claim 13, wherein the neighbor list is customized for the base station or the relay station and thereby is generated by referring to a distance between the base station or the relay station and neighboring nodes.

18. The method of claim 17, wherein the neighbor list is generated by setting a predetermined number of zones based on the base station or the relay station, and by selecting neighboring nodes according to a local policy for each zone.

19. The method of claim 13, wherein the neighbor information message corresponds to a unicast message.

20. The method of claim 13, wherein the neighbor information message comprises a neighbor station type field.

21. The method of claim 13, wherein the neighbor information message comprises location information of a neighbor station.

22. The method of claim 13, wherein:
a node receiving the second neighbor advertisement message corresponds to a mobile station, and
the mobile station determines a neighbor to be scanned using the neighbor list comprised in the second neighbor advertisement message, and performs a scan process with respect to the neighbor to be scanned.

23. The method of claim 13, wherein the neighbor advertisement message is generated by:
transmitting, by the base station or the relay station, a location request message to the node;
receiving, by the base station or the relay station, a location response message that is transmitted from the node in response to the location request message;
forming, by the base station or the relay station, a neighbor location information table using the location response message; and
generating, by the base station or the relay station, the neighbor advertisement message using the neighbor location information table.

24. The method of claim 23, wherein the location response message comprises location information of the node.

25. The method of claim 23, wherein the neighbor location information table stores a distance or an angle between the base station or the relay station and the node.

26. The method of claim 13, wherein the wireless communication network corresponds to a multi-hop wireless communication network.

27. A non-transitory computer-readable recording medium storing a program to implement a method of providing neighbor information, performed in a wireless communication network, the method comprising:
receiving, by a node, a neighbor advertisement message that is broadcast from a base station or a relay station over the wireless communication network;
receiving, by the node, a neighbor information message that is transmitted from the base station or the relay station;
generating a second neighbor advertisement message comprising at least one portion of a neighbor list comprised in the neighbor advertisement message, using the neighbor advertisement message and the neighbor information message; and
broadcasting, by the node, the second neighbor advertisement message over the wireless communication network.

28. A method of providing neighbor information, performed in a wireless communication network, the method comprising:
broadcasting, by a base station or a relay station, a neighbor advertisement message over the wireless communication network;
generating, by the base station or the relay station, a neighbor information message with respect to each of at least one node in the wireless communication network; and
transmitting, by the base station or the relay station, the generated neighbor information message to each of the at least one node.

29. The method of claim 28, wherein the neighbor information message is generated by referring to a predetermined reference point and positions of neighboring nodes.

30. The method of claim 28, wherein the neighbor advertisement message is generated by:
transmitting, by the base station or the relay station, a location request message to each of the at least one node;
receiving, by the base station or the relay station, a location response message that is transmitted from each of the at least node in response to the location request message;
forming, by the base station or the relay station, a neighbor location information table using the location response message; and
generating, by the base station or the relay station, the neighbor advertisement message using the neighbor location information table.

31. The method of claim 30, wherein the location response message comprises location information of each of the at least one node.

32. The method of claim 31, wherein the neighbor location information table stores a distance or an angle between the base station or the relay station and the at least one node.

33. The method of claim 28, wherein the neighbor information message is generated based on interference with at least one another node, measured by each of the at least one node.

34. A network apparatus in a wireless communication network, comprising:
- a communication unit configured to broadcast a neighbor advertisement message over the wireless communication network; and
- a controller configured to generate a neighbor information message with respect to each of at least one node in the wireless communication network,
- wherein the communication unit transmits the generated neighbor information message to each of the at least one node.

35. The network apparatus of claim 34, wherein the network apparatus corresponds to one of a base station, a relay station, a network control unit, and a mobile station.

36. A method of generating and providing neighbor information, performed in a wireless communication network, the method comprising:
- receiving, by a base station or a relay station, a location response message transmitted from at least one node in response to a location request message;
- generating a neighbor list according to the location response message;
- transmitting, from the base station or the relay station, a first neighbor advertisement message to the at least one node;
- generating a second neighbor advertisement message that includes at least a portion of the first neighbor advertisement message; and
- transmitting, by the at least one node, the second neighbor advertisement message.

* * * * *